United States Patent
Inoue (10) Patent No.: US 9,601,759 B2
(45) Date of Patent: Mar. 21, 2017

(54) CATHODE FOR SECONDARY BATTERIES, METHOD FOR PRODUCING CATHODE FOR SECONDARY BATTERIES, AND ALL-SOLID-STATE SECONDARY BATTERY

(71) Applicant: TOYOTA JIDOSHA KABUSHIKI KAISHA, Toyota-shi, Aichi-ken (JP)

(72) Inventor: Toshihiko Inoue, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/763,031

(22) PCT Filed: Jan. 14, 2014

(86) PCT No.: PCT/JP2014/050470
§ 371 (c)(1),
(2) Date: Jul. 23, 2015

(87) PCT Pub. No.: WO2014/115604
PCT Pub. Date: Jul. 31, 2014

(65) Prior Publication Data
US 2015/0325844 A1    Nov. 12, 2015

(30) Foreign Application Priority Data

Jan. 25, 2013   (JP) .................................. 2013-011905

(51) Int. Cl.
*H01M 10/0562* (2010.01)
*H01M 4/36* (2006.01)
(Continued)

(52) U.S. Cl.
CPC ......... *H01M 4/364* (2013.01); *H01M 4/0433* (2013.01); *H01M 4/131* (2013.01);
(Continued)

(58) Field of Classification Search
CPC . H01M 10/0562; H01M 4/0433; H01M 4/364
(Continued)

(56) References Cited

U.S. PATENT DOCUMENTS

2010/0273062 A1* 10/2010 Tsuchida ............... H01M 4/131
429/304
2011/0065002 A1   3/2011 Nagase
(Continued)

FOREIGN PATENT DOCUMENTS

JP    2001-196095 A    7/2001
JP    2006-156256 A    6/2006
(Continued)

*Primary Examiner* — James Lee
(74) *Attorney, Agent, or Firm* — Sughrue Mion, PLLC (57) ABSTRACT

To provide: a cathode for secondary batteries, which has a high capacity retention rate; a method for producing a cathode for secondary batteries; and an all-solid-state secondary battery comprising the cathode. This object has been achieved providing by a cathode for secondary batteries, which is characterized by comprising a cathode active material layer containing at least a cathode active material and a solid electrolyte, wherein the cathode active material has an oil absorption amount of 35 to 50 ml per 100 g; wherein the solid electrolyte has an average particle diameter of 1.5 to 2.5 μm; and wherein the cathode active material layer is formed by mixing the cathode active material and the solid electrolyte in the absence of solvent and pressure-forming the resulting mixture.

4 Claims, 4 Drawing Sheets (51) Int. Cl.
   *H01M 4/04* (2006.01)
   *H01M 4/131* (2010.01)
   *H01M 4/1391* (2010.01)
   *H01M 4/02* (2006.01)
   *H01M 10/0525* (2010.01)

(52) U.S. Cl.
   CPC ..... *H01M 4/1391* (2013.01); *H01M 10/0562* (2013.01); *H01M 10/0525* (2013.01); *H01M 2004/028* (2013.01); *H01M 2300/0065* (2013.01); *H01M 2300/0068* (2013.01); *Y02P 70/54* (2015.11)

(58) Field of Classification Search
   USPC .......................................................... 429/304
   See application file for complete search history.

(56) References Cited

U.S. PATENT DOCUMENTS

| | | |
|---|---|---|
| 2011/0262811 A1 | 10/2011 | Kinoshita et al. |
| 2013/0078365 A1 | 3/2013 | Mori et al. |
| 2014/0113193 A1 | 4/2014 | Tsunozaki et al. |

FOREIGN PATENT DOCUMENTS

| | | | |
|---|---|---|---|
| JP | 2009-211950 A | 9/2009 | |
| JP | 2009-238636 A | 10/2009 | |
| JP | 2013-73749 A | 4/2013 | |
| WO | 2010/064504 A1 | 6/2010 | |
| WO | 2011/033707 A1 | 3/2011 | |
| WO | 2012/176904 A1 | 12/2012 | |
| WO | WO 2012/176904 * | 12/2012 | .............. H01M 4/36 |

* cited by examiner

CATHODE FOR SECONDARY BATTERIES, METHOD FOR PRODUCING CATHODE FOR SECONDARY BATTERIES, AND ALL-SOLID-STATE SECONDARY BATTERY

CROSS REFERENCE TO RELATED APPLICATIONS

This application is a National Stage of International Application No. PCT/JP2014/050470 filed Jan. 14, 2014, claiming priority based on Japanese Patent Application No. 2013-011905 filed Jan. 25, 2013, the contents of all of which are incorporated herein by reference in their entirety.

TECHNICAL FIELD

The present invention relates to a cathode for secondary batteries, a method for producing a cathode for secondary batteries, and an all-solid-state secondary battery comprising the cathode.

BACKGROUND ART

A secondary battery is a battery which is able to convert chemical energy to electrical energy and discharge. It is also a battery that is able to convert electrical energy to chemical energy and store the chemical energy (charge) by passing a current in a direction that is opposite to the direction upon discharge.

In recent years, secondary batteries such as a lithium secondary battery are widely used as in-vehicle power sources or power sources for portable devices such as notebook PCs and mobile phones. Especially, an all-solid-state secondary battery comprising a solid electrolyte, instead of a liquid electrolyte using a combustible organic solvent as the solvent, has attracted attention as a battery which is safe from liquid leakage and excellent in stability.

A secondary battery generally comprises: a cathode having a cathode active material layer which contains a cathode active material; an anode having an anode active material layer which contains an anode active material; and an electrolyte layer disposed between the electrodes.

To improve the performance of secondary batteries, considerable research has been conducted on cathode active materials and electrolytes for use in secondary batteries (for example, see Patent Literatures 1 to 3).

For example, in Patent Literature 1, a cathode production method is used as a method for producing a cathode for secondary batteries, in which a cathode active material, an electroconductive material and a binder are mixed in the presence of a solvent to obtain a slurry, and the slurry is applied onto a current collector, dried and then pressurized, thereby producing a cathode. Also in Patent Literature 1, an oil absorption amount is defined as an indicator of the coating property of the cathode active material, on the premise of slurrying the cathode active material, and it is mentioned that a secondary battery in which the cathode uses the cathode active material having an oil absorption amount of 30 ml or more and 50 ml or less per 100 g, with respect to N-methylpyrrolidone (NMP), has excellent battery characteristics.

In the case of a secondary battery in which a liquid electrolyte is used in the electrolyte layer, the liquid electrolyte penetrates into the space between the particles of the cathode active material in the cathode active material layer. Therefore, the interface area between the cathode active material and the electrolyte is increased and makes it possible to efficiently conduct ions.

On the contrary, in the case of an all-solid-state secondary battery, since the electrolyte layer is a solid electrolyte layer comprising a solid electrolyte, the particles of the solid electrolyte are less likely to penetrate into the space between the particles of the cathode active material in the cathode active material layer. Therefore, compared to the secondary battery in which the liquid electrolyte is used in the electrolyte layer, the all-solid-state secondary battery is problematic in that the interface area between the cathode active material and the solid electrolyte is smaller and the ion conductivity is lower.

Accordingly, the cathode active material layer of the all-solid-state secondary battery is generally formed by using a mixture containing the cathode active material particles and the solid electrolyte particles, thereby securing the interface area between the cathode active material particles and the solid electrolyte particles and increasing the ion conductivity.

CITATION LIST

Patent Literature 1: International Publication No. WO2010/064504
Patent Literature 2: Japanese Patent Application Laid-Open (JP-A) No. 2009-211950
Patent Literature 3: JP-A No. 2009-238636

SUMMARY OF INVENTION

Technical Problem

It is known that a cathode active material used for cathode active material layers of secondary batteries experiences expansion and contraction since it occludes and releases ions upon charge and discharge. However, it is thought that when space is present between the particles of the cathode active material, the expansion and contraction of the cathode active material are absorbed by this space.

Meanwhile, in the case of the cathode active material layer of an all-solid-state secondary battery, from the viewpoint of obtaining high ion conductivity between the cathode active material and the solid electrolyte, the contact (adhesion) property between the particles of the cathode active material and the particles of the solid electrolyte is preferably high. Accordingly, in the production of the cathode of the all-solid-state secondary battery, to increase the contact property between the cathode active material particles and the solid electrolyte particles, it is required to minimize the space between the cathode active material particles and the solid electrolyte particles by applying a high forming pressure to a mixture containing the cathode active material particles and the solid electrolyte particles. As a result, however, the space between the cathode active material particles is decreased, so that the expansion and contraction of the cathode active material is less likely to absorbed upon charge and discharge, and problems such as cracking of the cathode active material, cracking of the cathode active material layer, and a decrease in the contact property between the cathode active material particles and the solid electrolyte particles are caused, and thus the capacity retention rate of the secondary battery is decreased.

In the case where, as with Patent Literature 1, a method of applying and drying a slurry is used to produce a cathode active material layer containing a cathode active material and a solid electrolyte, there is such a problem that the capacity retention rate is decreased. Also, the process of drying the slurry requires large scale equipment upon mass production, and there is a problem of high production cost.

The present invention was achieved in light of the above circumstances. The present invention is to provide: a cathode for secondary batteries which has a high capacity retention rate; a method for producing a cathode for secondary batteries; and an all-solid-state secondary battery comprising the cathode.

Solution to Problem

The cathode for secondary batteries according to the present invention is a cathode for secondary batteries, comprising a cathode active material layer containing at least a cathode active material and a solid electrolyte, wherein the cathode active material has an oil absorption amount of 35 to 50 ml per 100 g; wherein the solid electrolyte has an average particle diameter of 1.5 to 2.5 μm; and wherein the cathode active material layer is formed by mixing the cathode active material and the solid electrolyte in the absence of solvent and pressure-forming the resulting mixture.

In the present invention, the capacity retention rate of a secondary battery can be increased by combining the cathode active material having the above-specified oil absorption amount with the solid electrolyte having the above-specified average particle diameter, mixing them in the absence of solvent and pressure-forming the resulting mixture. The reason is that this makes it possible to prevent the cathode active material and the cathode active material layer from the occurrence of cracking and so on, which are induced by the expansion and contraction of the cathode active material upon charge and discharge, while this makes it possible to secure the contact property between the cathode active material and the solid electrolyte.

In the cathode for secondary batteries according the present invention, the cathode active material preferably has a layered crystal structure.

In the cathode for secondary batteries according the present invention, the solid electrolyte is preferably a sulfide-based solid electrolyte. This is because the sulfide-based solid electrolyte is soft and deformable and makes it easy to form ion conducting paths.

The all-solid-state secondary battery of the present invention comprises the above-described cathode for secondary batteries; an anode; and a solid electrolyte layer disposed between the cathode and the anode. Because the all-solid-state secondary battery of the present invention comprises the cathode for secondary batteries according to the present invention, it has an excellent capacity retention rate.

The method for producing a cathode for secondary batteries according to the present invention comprises the steps of: preparing a mixture by mixing at least a cathode active material and a solid electrolyte in the absence of solvent, the cathode active material having an oil absorption amount of 35 to 50 ml per 100 g, and the solid electrolyte having an average particle diameter of 1.5 to 2.5 μm, and pressure-forming the resulting mixture.

Advantageous Effects of Invention

According to the present invention, the cathode active material and the cathode active material layer are prevented from the occurrence of cracking and so on, which are induced by the expansion and contraction of the cathode active material upon charge and discharge; therefore, the capacity retention rate of the secondary battery can be increased.

DESCRIPTION OF EMBODIMENTS

Hereinafter, the present invention, i.e., a cathode for secondary batteries a method for producing a cathode for secondary batteries, and an all-solid-state secondary battery comprising a cathode for secondary batteries, will be described in detail.

1. Cathode for Secondary Batteries

The cathode for secondary batteries according to the present invention, comprises a cathode active material layer containing at least a cathode active material and a solid electrolyte, wherein the cathode active material has an oil absorption amount of 35 to 50 ml per 100 g; wherein the solid electrolyte has an average particle diameter of 1.5 to 2.5 μm; and wherein the cathode active material layer is formed by mixing the cathode active material and the solid electrolyte in the absence of solvent and pressure-forming the resulting mixture.

Diligent research was made by the inventor of the present invention, in order to achieve a secondary battery which prevents the cathode active material and the cathode active material layer from the occurrence of cracking and so on, which are induced by the expansion and contraction of the cathode active material upon charge and discharge, and which meanwhile secures the contact property between the cathode active material and the solid electrolyte, and which shows an excellent capacity retention rate.

First, the inventor of the present invention studied the method for producing a cathode active material layer by, as in Patent Literature 1, mixing a cathode active material and a solid electrolyte in the presence of a solvent to prepare a slurry and then applying the slurry onto a substrate and drying the same.

Figure 1:
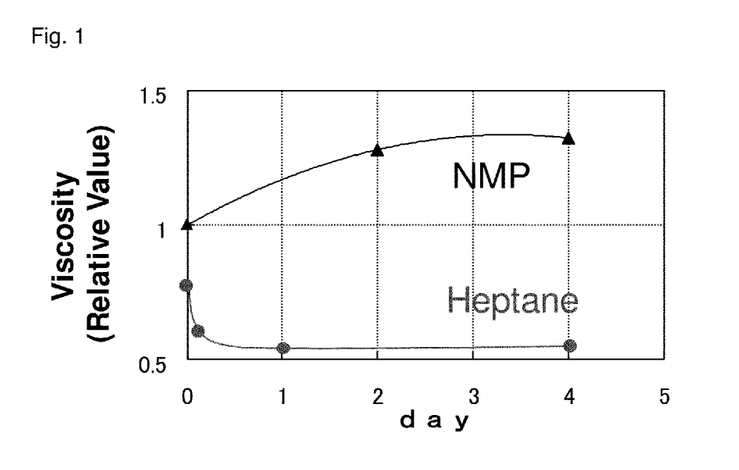
FIG. 1 is a view showing the relative values of time-dependent viscosity of a slurry using NMP and a slurry using heptane.

In such a method that uses the application of the slurry, the capacity retention rate of a secondary battery may decrease. The reason is considered as follows: when NMP or water is used as the solvent of the slurry, it reacts with a solid electrolyte such as a sulfide solid electrolyte. Therefore, NMP and water cannot be used as the solvent of the slurry. Instead, when butyl butyrate, heptane or the like is used as the solvent, the time-dependent viscosity stability of the slurry is insufficient and, as shown in FIG. 1 for example, the time-dependent viscosity stability lasts for several minutes to ten minutes, while the time-dependent viscosity stability of the slurry using the NMP-based solvent lasts for several days to one week. FIG. 1 shows the relative values of time-dependent viscosity of a slurry using NMP as the solvent and a slurry using heptane as the solvent, the values being measured by an E-type viscometer. When the slurry with insufficient time-dependent viscosity stability is used, the surface smoothness of a coating film thus obtained is significantly decreased. As a result, the distance between the surface of the cathode active material layer and that of the solid electrolyte layer becomes uneven. Therefore, the reaction in the cathode active material layer becomes non-uniform, and the capacity retention rate is considered to decrease. When the surface smoothness of the thus-obtained coating film is low, it can be a cause of slight short circuit in the initial stage.

The inventor of the present invention has also found that the capacity retention rate can be increased by combining the cathode active material having an oil absorption amount of 35 to 50 ml per 100 g with the solid electrolyte having an average particle diameter of 1.5 to 2.5 µm. This is considered because the contact property between the cathode active material and the solid electrolyte is secured and, at the same time, cracking of the cathode active material, cracking of the cathode active material layer and so on become less likely to occur.

In particular, because the cathode active material has an oil absorption amount of 35 ml or more per 100 g, appropriate space is present inside the cathode active material particles (primary particles) and/or between the cathode active material particles (primary particles). It is considered that due to this space, the cathode active material can be prevented from expansion and contraction upon charge and discharge, and when expansion and contraction are generated, they are absorbed by the space. Also, because the cathode active material has an oil absorption amount of 50 ml or less per 100 g, the strength of the cathode active material itself is secured. Therefore, it is presumed that even after repeating charge and discharge, the occurrence of cracking of the cathode active material, cracking of the cathode active material layer and so on can be prevented. Cracking of the cathode active material causes a decrease in ion occluding/releasing performance upon charge and discharge, and cracking of the cathode active material layer causes a decrease in ion conductivity, electron conductivity and so on of the cathode active material layer. In addition, because the mechanical strength of the cathode active material is secured, cracking of the cathode active material and cathode active material layer is less likely to occur upon pressure-forming.

Also, because the solid electrolyte has an average particle diameter of 1.5 µm or more, even if the cathode active material experiences expansion and contraction upon charge and discharge, the solid electrolyte is less likely to undergo a displacement inside the cathode active material layer, and the solid electrolyte can easily follow the expansion and contraction of the cathode active material associated with charge and discharge. Also, because the solid electrolyte has an average particle diameter of 2.5 µm or less, the interface area with the cathode active material can be secured. Therefore, it is presumed that even after repeating charge and discharge, the interface area between the cathode active material and solid electrolyte of the cathode active material layer is secured.

Based on the above findings, the inventor of the present invention completed the present invention. In particular, the inventor has succeeded in obtaining a cathode for secondary batteries which can increase the capacity retention rate of a secondary battery, by combining the cathode active material having an appropriate oil absorption amount with the solid electrolyte having an appropriate average particle diameter, mixing the cathode active material with the solid electrolyte in the absence of solvent, and then pressure-forming the resulting mixture.

In addition, the inventor of the present invention has also confirmed that the resistance increase rate of a secondary battery can be suppressed by using the cathode for secondary batteries obtained as above. This is considered because, in the cathode for secondary batteries according to the present invention, the above-described cracking of the cathode active material and the cathode active material layer and the above-described displacement of the solid electrolyte in the cathode active material layer, etc., are prevented. That is, according to the present invention, it is possible to provide a cathode for secondary batteries having both a low resistance increase rate and a high capacity retention rate.

In the cathode of the present invention, the cathode active material layer is formed by mixing the above-specified cathode active material with the above-specified solid electrolyte in the absence of solvent, and pressure-forming the resulting mixture. Therefore, in the cathode active material layer production step, it is not needed to select an appropriate solvent that for slurrying. Also, because no solvent is used, the capacity retention rate of a secondary battery can be increased, and no drying step is needed; therefore, a reduction in production cost can be achieved.

In the present invention, the oil absorption amount of the cathode active material means the volume (ml) of linseed oil absorbed by per 100 g of the cathode active material. It is used as an indicator that indirectly expresses the size, form, etc., of pores inside the cathode active material particles and/or of space between the cathode active material particles.

The oil absorption amount can be measured in accordance with JIS K6217 standard. In particular, it can be measured with absorption measuring device S-410 manufactured by Asahisouken Co., Ltd., using linseed oil. More specifically, it is measured by, with kneading a given amount of dried cathode active material, adding linseed oil to the kneaded material in a dropwise manner and measuring the resulting change in viscosity with a torque detector. The oil absorption amount per 100 g of the cathode active material can be calculated by dividing the linseed oil amount at the point where the torque value of the kneaded material measured by the torque detector is 70% of the maximum torque value, by the amount of the cathode active material added.

In the present invention, the average particle diameter of particles is calculated by a conventional method. For example, a method for calculating the average particle diameter of particles is as follows. First, the particle diameter of a particle shown in a transmission electron microscopy (TEM) image at a magnification of 400,000 or 1,000,000 times is calculated, provided that the particle is regarded as spherical. Such an average particle diameter calculation by TEM observation is carried out on 200 to 300 particles of the same type, and the thus-obtained average of the particles is deemed as the average particle diameter.

Also in the present invention, "mixing the cathode active material and the solid electrolyte in the absence of solvent and pressure-forming the resulting mixture" means that substantially no solvent is used at the time of mixing the cathode active material and the solid electrolyte and at the time of pressure-forming the resulting mixture. That is, it differs from a so-called wet process in which the cathode active material, solid electrolyte and so on are made into a slurry by using a solvent, and the slurry is applied and dried (i.e., the solvent is volatilized) to form a cathode active material layer. It is a so-called powder compaction forming in which a powdery material is formed into a compacted product by applying pressure. As used herein, "substantially no solvent is used" is ideally such that absolutely no solvent is used at the time of mixing the cathode active material with the solid electrolyte and at the time of pressure-forming the resulting mixture. However, it does not exclude the case where, for example, a very slight amount of solvent used to synthesize the solid electrolyte or cathode active material is left and contained in the resulting mixture.

The cathode of the present invention can be used as a cathode for constituting a secondary battery, and it imposes no limit on the type, application, etc., of the secondary battery. Although no solvent is used in the cathode of the present invention, the interface area between the cathode active material and the solid electrolyte is secured in the cathode active material layer; therefore, the cathode of the present invention can be suitably used in all-solid-state secondary batteries comprising solid electrolyte layers.

Hereinafter, the components of the cathode for secondary batteries according to the present invention will be described in detail.

The cathode for secondary batteries according to the present invention comprises a cathode active material layer containing at least a cathode active material and a solid electrolyte. In addition to the cathode active material layer, the cathode for secondary batteries according to the present invention may comprise a cathode current collector and a cathode lead connected to the cathode current collector.

The cathode active material is not particularly limited, as long as it has an oil absorption amount of 35 to 50 ml per 100 g.

The method for setting the oil absorption amount of the cathode active material in this range is not particularly limited. For example, the oil absorption amount can be set in the range by controlling the conditions for synthesizing the cathode active material (e.g., pH upon the coprecipitation of primary particles, firing conditions for firing secondary particles) or controlling the conditions for pulverizing the cathode active material.

The crystal structure of the cathode active material is not particularly limited. The examples include a layered structure, an olivine structure and a spinel structure. Preferably, the cathode active material has a layered structure.

The cathode active material can be appropriately selected, depending on conducting ion species (such as lithium ion). As the cathode active material of a lithium secondary battery, for example, there may be mentioned lithium transition metal compounds such as lithium nickel cobalt manganate ($LiNi_xCo_{1-y-x}Mn_yO_2$), $LiCo_xMn_yO_2$, $LiCoMnO_4$, $LiNi_xCo_yO_2$, $LiNi_xMn_yO_2$, $Li_2NiMn_3O_8$, lithium cobaltate ($LiCoO_2$), lithium nickelate ($LiNiO_2$), lithium manganate ($LiMnO_2$), $LiMn_2O_4$, iron olivine ($LiFePO_4$), $Li_3Fe_2(PO_4)_3$, cobalt olivine ($LiCoPO_4$), nickel olivine ($LiNiPO_4$), manganese olivine ($LiMnPO_4$), lithium titanate ($Li_4Ti_5O_{12}$) and lithium vanadium phosphate ($Li_3V_2(PO_4)_3$, hereinafter may be referred to as LVP); and chalcogen compounds such as copper chevrel ($Cu_2Mo_6S_8$), iron sulfide (FeS), cobalt sulfide (CoS) and nickel sulfide (NiS).

As the cathode active material having a layered structure, there may be mentioned $LiNi_{1/3}Co_{1/3}Mn_{1/3}O_2$, lithium cobaltate ($LiCoO_2$) and lithium nickelate ($LiNiO_2$), for example.

As the cathode active material having an olivine structure, there may be mentioned iron olivine ($LiFePO_4$), $Li_3Fe_2(PO_4)_3$, cobalt olivine ($LiCoPO_4$), nickel olivine ($LiNiPO_4$) and manganese olivine ($LiMnPO_4$), for example.

As the cathode active material having a spinel structure, there may be mentioned lithium manganate ($LiMnO_2$), $LiMn_2O_4$, $LiCoMnO_4$ and $Li_2NiMn_3O_8$, for example.

The average particle diameter of the cathode active material is preferably 3 to 15 µm, particularly preferably 4 to 8 µm.

When the average particle diameter of the cathode active material is too small, as the specific surface area increases, the amounts of the electroconductive material and the solid electrolyte, which are required for electron conduction and ion conduction, become excessive, so that the energy density is decreased. On the other hand, when the average particle diameter of the cathode active material is too large, it is difficult to fill the solid electrolyte which is necessary to maintain ion conductivity into the space between the particles.

The average particle diameter of the cathode active material can be obtained by the above-mentioned method using the TEM observation.

In the present invention, the cathode active material is preferably in a particulate form. This is because space can be formed between the solid electrolyte particles in the cathode active material layer, and a mechanical displacement associated with the expansion and contraction of the cathode active material, can be absorbed by the space.

The content of the cathode active material in the cathode active material layer is not particularly limited. From the viewpoint of battery capacity, the content is preferably as large as possible. For example, when the total mass of the cathode active material layer is 100% by mass, the content is preferably 60 to 75% by mass.

The solid electrolyte is not particularly limited, as long as the average particle diameter is in the range of 1.5 to 2.5 µm.

The average particle diameter of the solid electrolyte can be obtained by the above-mentioned method using the TEM observation.

In the present invention, the solid electrolyte is preferably in a particulate form. This is because space can be formed between the solid electrolyte particles in the cathode active material layer, and a mechanical displacement that is associated with the expansion and contraction of the cathode active material, can be absorbed by the space.

The solid electrolyte can be appropriately selected, depending on conducting ion species (such as lithium ion). As the solid electrolyte, for example, there may be mentioned an oxide-based solid electrolyte and a sulfide-based solid electrolyte. The solid electrolyte is preferably a sulfide-based solid electrolyte. This is because the sulfide-based solid electrolyte is soft and deformable and makes it easy to form ion conducting paths.

The sulfide-based solid electrolyte is not particularly limited, as long as it contains sulfur (S) and has ion conductivity and insulating properties. For example, there may be mentioned the following materials and similar materials different in the composition of elements: $Li_2S$—$P_2S_5$ ($Li_2S$: $P_2S_5$=50:50 to 100:0 in molar ratio), $Li_2S$—$P_2S_5$—$LiI$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (Z=Ge, Zn, Ga), $Li_2S$—$GeS_2$, $Li_{3.25}P_{0.25}Ge_{0.76}S_4$, $Li_{4-x}Ge_{1-x}P_xS_4$, $Li_7P_3S_{11}$, $Li_2S$—$SiS_2$—$Li_3PO_4$, and $Li_2S$—$SiS_2$—$Li_xMO_y$ (M=P, Si, Ge, B, Al, Ga, In).

As the oxide-based solid electrolyte, for example, there may be mentioned a NASICON-type oxide, a perovskite-type oxide, a LISICON-type oxide and a garnet-type oxide. Concrete examples of oxide-based solid electrolytes that can be used in all-solid-state lithium secondary batteries are as follows.

As the NASICON-type oxide, for example, there may be mentioned the following materials and similar materials different in the composition of elements: an oxide represented by $Li_aX_bYg_dO_e$ (wherein X is at least one selected from the group consisting of B, Al, Ga, In, C, Si, Ge, Sn, Sb and Se; Y is at least one selected from the group consisting of Ti, Zr, Ge, In, Ga, Sn and Al; and a to e satisfy the following formulae: $0.5<a<5.0$, $0 \leq b<2.98$, $0.5 \leq c<3.0$, $0.02<d \leq 3.0$, $2.0<b+d<4.0$ and $3.0<e \leq 12.0$). Particularly preferred are an oxide represented by the above formula in which X=Al and Y=Ti (Li—Al—Ti—P—O-based NASICON-type oxide) and an oxide represented by the above formula in which X=Al and Y=Ge or X=Ge and Y=Al (Li—Al—Ge—P—O-based NASICON-type oxide). Concrete examples thereof include $Li_{1.5}Al_{0.5}Ge_{1.5}(PO_4)_3$ (hereinafter may be referred to as LAGP).

As the perovskite-type oxide, for example, there may be mentioned an oxide represented by $Li_xLa_{1-x}TiO_3$ (Li—La—Ti—O-based perovskite-type oxide).

As the LISICON-type oxide, for example, there may be mentioned the following materials and similar materials different in the composition of elements: $Li_4XO_4$—$Li_3YO_4$ (wherein X is at least one selected from Si, Ge and Ti, and Y is at least one selected from P, As and V), $Li_4XO_4$—$Li_2AO_4$ (wherein X is at least one selected from Si, Ge and Ti, and A is at least one selected from Mo and S), $Li_4XO_4$—$Li_2ZO_2$ (X is at least one selected from Si, Ge and Ti, and Z is at least one selected from Al, Ga and Cr), $Li_4XO_4$—$Li_2BXO_4$ (X is at least one selected from Si, Ge and Ti, and B is at least one selected from Ca and Zn) and $Li_3DO_3$—$Li_3YO_4$ (D is B, and Y is at least one selected from P, As and V). Particularly preferred are $Li_4SiO_4$—$Li_3PO_4$, $Li_3BO_3$—$Li_3PO_4$, etc.

As the garnet-type oxide, for example, there may be mentioned an oxide represented by $Li_{3+x}A_yG_zM_{2-v}B_vO_{12}$ and similar materials different in the composition of elements. In this formula, A, G, M and B are metal cations. A is preferably an alkaline-earth metal cation such as Ca, Sr, Ba or Mg, or a transition metal cation such as Zn. G is preferably a transition metal cation such as La, Y, Pr, Nd, Sm, Lu or Eu. M is preferably a transition metal cation such as Zr, Nb, Ta, Bi, Te or Sb, and M is particularly preferably Zr. B is preferably In, for example. Also, x preferably satisfies $0 \leq x \leq 5$, more preferably $4 \leq x \leq 5$; y preferably satisfies $0 \leq y \leq 3$, more preferably $0 \leq y \leq 2$; z preferably satisfies $0 \leq z \leq 3$, more preferably $1 \leq z \leq 3$; and v preferably satisfies $0 \leq v \leq 2$, more preferably $0 \leq v \leq 1$. O may be partially or absolutely replaced with a divalent anion and/or trivalent anion, such as $N^{3-}$. As the garnet-type oxide, an Li—La—Zr—O-based oxide such as $Li_7La_3Zr_2O_{12}$ is preferred.

The content of the solid electrolyte in the cathode active material layer is not particularly limited, as long as ion conductivity can be secured. From the viewpoint of securing battery capacity, the content is preferably as small as possible. For example, when the total mass of the cathode active material layer is 100% by mass, the content is preferably 25 to 40% by mass.

As needed, the cathode active material layer may contain an electroconductive material, a binder, etc.

The electroconductive material is not particularly limited, as long as it can increase the electroconductivity of the cathode active material layer. For example, there may be mentioned an electroconductive carbonaceous material.

The electroconductive carbonaceous material is not particularly limited. From the viewpoint of the area or space of reaction sites, a carbonaceous material with a high specific surface area is preferred. More specifically, the electroconductive carbonaceous material preferably has a specific surface area of 10 $m^2/g$ or more, more preferably 100 $m^2/g$ or more, still more preferably 600 $m^2/g$ or more.

Concrete examples of the electroconductive carbonaceous material with a high specific surface area include carbon black (such as acetylene black and Ketjen black), activated carbon, and carbon fibers (such as carbon nanotubes (CNT), carbon nanofibers and vapor-grown carbon fibers).

The specific surface area of the electroconductive material can be measured by the BET method, for example.

The content of the electroconductive material in the cathode active material layer varies depending on the type of the electroconductive material. In general, when the total mass of the cathode active material layer is 100% by mass, the content of the electroconductive material is preferably 1 to 30% by mass.

As the binder, for example, there may be mentioned polyvinylidene fluoride (PVdF) and polytetrafluoroethylene (PTFE). The content of the binder in the cathode active material layer is such a content that can fix the cathode active material, etc., and it is preferably as small as possible. In general, when the total mass of the cathode active material layer is 100% by mass, the content of the binder is preferably 1 to 10% by mass.

The thickness of the cathode active material layer varies depending on the intended use of the battery, etc. It is preferably 10 to 250 μm, more preferably 20 to 200 μm, still more preferably 30 to 150 μm.

The cathode current collector functions to collect current from the cathode active material layer. As the material for the cathode current collector, for example, there may be mentioned aluminum, SUS, nickel, iron, carbon and titanium. As the form of the cathode current collector, for example, there may be mentioned a foil form, a plate form and a mesh form.

In the cathode for secondary batteries according to the present invention, the cathode active material layer is formed by mixing the cathode active material and the solid electrolyte in the absence of solvent and pressure-forming the resulting mixture.

The method for forming the cathode active material layer will be described in detail, under the following "2. Method for producing the cathode for secondary batteries".

2. Method for Producing the Cathode for Secondary Batteries

The method for producing a cathode for secondary batteries according to the present invention comprises the steps of: preparing a mixture by mixing at least a cathode active material and a solid electrolyte in the absence of solvent, the cathode active material having an oil absorption amount of 35 to 50 ml per 100 g, and the solid electrolyte having an average particle diameter of 1.5 to 2.5 µm, and pressure-forming the resulting mixture.

In the method for producing the cathode for secondary batteries according to the present invention, the cathode active material layer is formed by mixing the cathode active material with the solid electrolyte in the absence of solvent, and pressure-forming the resulting mixture. Therefore, no drying step is needed, and a reduction in production cost can be achieved. Also, the method can produce the above-described cathode for secondary batteries according to the present invention, and it contributes to increasing the capacity retention rate of the secondary battery.

The mixture preparing step is a step of preparing a mixture by mixing at least a cathode active material and a solid electrolyte in the absence of solvent, the cathode active material having an oil absorption amount of 35 to 50 ml per 100 g, and the solid electrolyte having an average particle diameter of 1.5 to 2.5 µm.

The materials and contents of the cathode active material and solid electrolyte can be the same as those described above under "1. Cathode for secondary batteries".

The method for mixing the cathode active material with the solid electrolyte is not particularly limited, as long as they are mixed in the absence of solvent. For example, there may be mentioned a mixing method using a mortar, bead mill, ball mill, etc.

As needed, the mixture may contain an electroconductive material, a binder, etc., in addition to the cathode active material and the solid electrolyte. The materials and contents of the electroconductive material and binder can be the same as those described above under "1. Cathode for secondary batteries". The mixture containing the electroconductive material and the binder is prepared by mixing the electroconductive material and the binder in the absence of solvent, in combination with the cathode active material and the solid electrolyte.

In the pressure-forming step, the cathode active material layer is formed by pressure-forming the mixture prepared above.

From the viewpoint of increasing the capacity retention rate, the pressure applied upon the pressure forming is preferably 0.5 ton/cm$^2$ ($\approx$49 MPa) or more, particularly preferably 1.5 ton/cm$^2$ ($\approx$147 MPa) or more, and it is also preferably 7 ton/cm$^2$ ($\approx$686 MPa) or less, particularly preferably 4 ton/cm$^2$ ($\approx$392 MPa) or less. When the pressure is too low, the contact (adhesion) property between the solid electrolyte and the cathode active material may not be secured in the cathode active material layer. When the pressure is too high, the space between the cathode active material particles is decreased and fails to absorb the expansion and contraction of the cathode active material, which are associated with charge and discharge. Therefore, for example, destruction of the structure of the cathode active material or cracking of the cathode active material may be caused, so that the capacity retention rate of the secondary battery may be decreased.

The method for pressure-forming the mixture is not particularly limited. For example, there may be mentioned a method of filling a mold (such as a metal mold) with the prepared mixture and then applying a pressure thereto. At this time, by placing the cathode current collector and/or the below-described solid electrolyte layer in the mold and pressurizing the current collector and/or the solid electrolyte layer in combination with the mixture, the cathode active material layer to which the cathode current collector and/or the solid electrolyte layer is layered, can be produced.

3. All-Solid-State Secondary Battery

The all-solid-state secondary battery of the present invention comprises: the cathode for secondary batteries according to the present invention; an anode; and a solid electrolyte layer disposed between the cathode and the anode.

Figure 2:
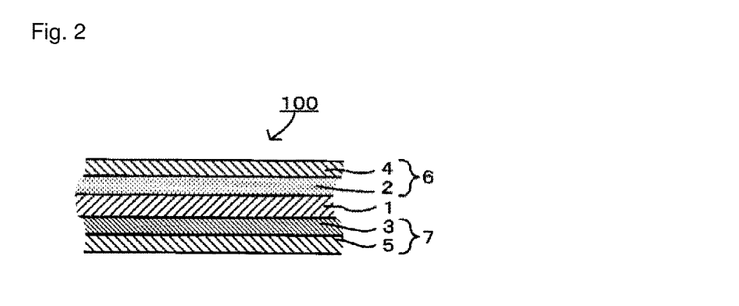
FIG. 2 is a schematic sectional view showing an example of an all-solid-state secondary battery comprising a cathode for secondary batteries.

FIG. 2 is a view showing an example of the all-solid-state secondary battery of the present invention, and it is also a schematic sectional view of the battery cut along the laminating direction. The all-solid-state secondary battery of the present invention is not limited to this example.

An all-solid-state secondary battery 100 comprises: a cathode 6 comprising a cathode active material layer 2 and a cathode current collector 4; an anode 7 comprising an anode active material layer 3 and an anode current collector 5; and a solid electrolyte layer 1 disposed between the cathode 6 and the anode 7.

Hereinafter, the components of the all-solid-state secondary battery of the present invention will be described.

The anode comprises the anode active material layer containing the anode active material. In the present invention, the anode may also comprise an anode current collector and an anode lead connected to the anode current collector, in addition to the anode active material layer.

The anode active material is not particularly limited, as long as it can occlude/release conducting ion species, typically metal ions. For example, there may be mentioned carbonaceous materials such as mesocarbon microbeads (MCMB), highly-oriented pyrolytic graphite (HOPG), hard carbon and soft carbon; lithium transition metal oxides such as lithium titanate ($Li_4Ti_5O_{12}$); and metal alloys such as $La_3Ni_2Sn_7$. The anode active material may be in a powdery form, or it may be in a thin film form.

As needed, the anode active material layer may contain a solid electrolyte, an electroconductive material, a binder, etc.

The details of the solid electrolyte, electroconductive material and binder are the same as those of the solid electrolyte, electroconductive material and binder of the above-described cathode active material layer.

The thickness of the anode active material layer is not particularly limited. For example, it is preferably 10 to 100 µm, particularly preferably 10 to 50 µm.

The anode current collector functions to collect current from the anode active material layer. As the material for the anode current collector, for example, there may be mentioned SUS, nickel, copper and carbon. As the form of the anode current collector, for example, there may be used the same forms as those of the cathode current collector described above.

The method for producing the anode is not particularly limited. In the case of using the anode active material in a powdery form, from the viewpoint of reducing battery production cost, preferred is a method of producing the anode active material layer by pressure-forming the anode active material or the mixture containing the anode active material, in the absence of solvent. At this time, by pressurizing the mixture in the state of being disposed on the anode current collector and/or the below-described solid electrolyte layer, the anode active material layer to which the anode current collector and/or the solid electrolyte layer is layered, can be produced.

The content of the solid electrolyte in the anode active material layer can be the same as the content of the solid electrolyte in the above-described cathode active material layer. The pressure applied upon the pressure-forming of the anode active material layer is not particularly limited.

The solid electrolyte layer is disposed between the cathode and the anode and functions to exchange conducting ion species between the cathode and the anode.

The solid electrolyte layer comprises at least the solid electrolyte. As needed, it may contain the above-described binder. As the solid electrolyte contained in the solid electrolyte layer, there may be used one which is the same as the solid electrolyte contained in the cathode active material layer.

The content of the solid electrolyte in the solid electrolyte layer is not particularly limited, as long as it is a content that provides a desired insulating property. It is preferably in a range of 10 to 100% by volume, particularly preferably in a range of 50 to 100% by volume.

The thickness of the solid electrolyte layer is preferably in a range of 0.1 to 1,000 µm, more preferably in a range of 0.1 to 300 µm.

The method for producing the solid electrolyte layer is not particularly limited. From the viewpoint of reducing production cost, preferred is a method in which the solid electrolyte or the mixture containing the solid electrolyte is pressure formed in the absence of solvent. At this time, by pressurizing the mixture in the state of being disposed on the cathode active material layer and/or the anode active material layer, the solid electrolyte layer to which the cathode active material layer and/or the anode active material layer is layered, can be produced.

The all-solid-state secondary battery of the present invention may comprise a battery case for housing the cathode, the solid electrolyte layer, the anode, etc. Concrete examples of the form of the battery case include a coin form, a flat plate form, a cylindrical form and a laminate form.

As the type of the all-solid-state secondary battery of the present invention, for example, there may be mentioned an all-solid-state lithium secondary battery, an all-solid-state sodium secondary battery, an all-solid-state magnesium secondary battery and an all-solid-state calcium secondary battery. Of them, an all-solid-state lithium secondary battery is preferred.

EXAMPLES

Example 1

Synthesis of Solid Electrolyte $Li_2S$ (manufactured by Nippon Chemical Industrial Co., Ltd.) and $P_2S_5$ (manufactured by Aldrich) were used as starting materials. First, 0.7656 g of $Li_2S$ and 1.2344 g of $P_2S_5$ were weighed and mixed in an agate mortar for 5 minutes. Then, 4 g of heptane was added thereto, and using a planetary ball mill, the mixture was subjected to mechanical milling for 40 hours, thus obtaining a solid electrolyte, that is, $Li_2S$—$P_2S_5$ ($Li_2S:P_2S_5$=75:25 in molar ratio). Thereafter, by classifying the solid electrolyte, it was separated into a solid electrolyte having an average particle diameter of 0.8 µm, a solid electrolyte having an average particle diameter of 1.5 µm, a solid electrolyte having an average particle diameter of 2.5 µm, and a solid electrolyte having an average particle diameter of 5 µm. In Example 1, the solid electrolyte having an average particle diameter of 1.5 µm was used.

[Production of Battery]

First, $LiNi_{1/3}Co_{1/3}Mn_{1/3}O_2$ having a layered structure (oil absorption amount 35.7 ml/100 g, manufactured by Nichia Corporation) was provided as a cathode active material, and VGCF (trade name, manufactured by Showa Denko K. K.) was provided as an electroconductive material. Then, 12.03 mg of the cathode active material, 0.51 mg of the electroconductive material and 5.03 mg of the solid electrolyte synthesized above (average particle diameter 1.5 µm) were weighed and mixed in the absence of solvent, thus preparing a cathode mixture (cathode active material:solid electrolyte:electroconductive material=68:29:3 in mass ratio).

As an anode active material, graphite (oil absorption amount 59.2 ml/100 g, manufactured by Mitsubishi Chemical Corporation) was provided. Then, 9.06 mg of the anode active material and 8.24 mg of a solid electrolyte synthesized in the same manner as described above (average particle diameter 10 µm) were weighed and mixed in the absence of solvent, thus preparing an anode mixture (anode active material:solid electrolyte=52:48 in mass ratio).

Next, 18 mg of a solid electrolyte synthesized in the same manner as described above (average particle diameter 1.0 µm) was weighed and put in a 1 $cm^2$ mold and then pressed at 1 ton/$cm^2$ ($\approx$98 MPa), thus producing a solid electrolyte layer. Onto one side of the solid electrolyte layer in the mold, 17.57 mg of the cathode mixture was put and pressed at ton/$cm^2$ ($\approx$98 MPa), thus producing a cathode active material layer. Then, onto the other side of the solid electrolyte layer in the mold, 17.3 mg of the anode mixture was put and pressed at 4 ton/$cm^2$ ($\approx$392 MPa), thus producing an anode active material layer. As current collectors, a 15 µm Al foil (manufactured by Nippon Foil Mfg. Co., Ltd.) was layered to the cathode side, and a 10 µm Cu foil (manufactured by Nippon Foil Mfg. Co., Ltd.) was layered to the anode side, thus obtaining an all-solid-state lithium secondary battery.

Example 2

An all-solid-state lithium secondary battery was produced in the same manner as Example 1, except that the cathode active material layer was produced by using a cathode active material having an oil absorption amount of 40.2 ml/100 g.

Example 3

An all-solid-state lithium secondary battery was produced in the same manner as Example 1, except that the cathode active material layer was produced by using a cathode active material having an oil absorption amount of 45.5 ml/100 g.

Example 4

An all-solid-state lithium secondary battery was produced in the same manner as Example 1, except that the cathode active material layer was produced by using a solid electrolyte having an average particle diameter of 2.5 μm and a cathode active material having an oil absorption amount of 35.7 ml/100 g.

Example 5

An all-solid-state lithium secondary battery was produced in the same manner as Example 1, except that the cathode active material layer was produced by using a solid electrolyte having an average particle diameter of 2.5 μm and a cathode active material having an oil absorption amount of 40.2 ml/100 g.

Example 6

An all-solid-state lithium secondary battery was produced in the same manner as Example 1, except that the cathode active material layer was produced by using a solid electrolyte having an average particle diameter of 2.5 μm and a cathode active material having an oil absorption amount of 45.5 ml/100 g.

Example 7

An all-solid-state lithium secondary battery was produced in the same manner as Example 1, except that the cathode active material layer was produced by using a solid electrolyte having an average particle diameter of 2.0 μm and a cathode active material having an oil absorption amount of 35.7 ml/100 g.

Comparative Example 1

An all-solid-state lithium secondary battery was produced in the same manner as Example 1, except that the cathode active material layer was produced by using a cathode active material having an oil absorption amount of 19.2 ml/100 g.

Comparative Example 2

An all-solid-state lithium secondary battery was produced in the same manner as Example 1, except that the cathode active material layer was produced by using a cathode active material having an oil absorption amount of 24.6 ml/100 g.

Comparative Example 3

An all-solid-state lithium secondary battery was produced in the same manner as Example 1, except that the cathode active material layer was produced by using a cathode active material having an oil absorption amount of 31.2 ml/100 g.

Comparative Example 4

An all-solid-state lithium secondary battery was produced in the same manner as Example 1, except that the cathode active material layer was produced by using a cathode active material having an oil absorption amount of 53.3 ml/100 g.

Comparative Example 5

An all-solid-state lithium secondary battery was produced in the same manner as Example 1, except that the cathode active material layer was produced by using a solid electrolyte having an average particle diameter of 0.8 μm and a cathode active material having an oil absorption amount of 35.7 ml/100 g.

Comparative Example 6

An all-solid-state lithium secondary battery was produced in the same manner as Example 1, except that the cathode active material layer was produced by using a solid electrolyte having an average particle diameter of 5 μm and a cathode active material having an oil absorption amount of 35.7 ml/100 g.

Comparative Example 7

An all-solid-state lithium secondary battery was produced in the same manner as Example 1, except that the cathode active material layer was produced by using a solid electrolyte having an average particle diameter of 0.8 μm and a cathode active material having an oil absorption amount of 19.2 ml/100 g.

Comparative Example 8

An all-solid-state lithium secondary battery was produced in the same manner as Example 1, except that the cathode active material layer was produced by using a solid electrolyte having an average particle diameter of 5 μm and a cathode active material having an oil absorption amount of 19.2 ml/100 g.

Comparative Example 9

An all-solid-state lithium secondary battery was produced in the same manner as Example 1, except that the cathode active material layer was produced by using a solid electrolyte having an average particle diameter of 0.8 μm and a cathode active material having an oil absorption amount of 53.3 ml/100 g.

Comparative Example 10

An all-solid-state lithium secondary battery was produced in the same manner as Example 1, except that the cathode active material layer was produced by using a solid electrolyte having an average particle diameter of 5 μm and a cathode active material having an oil absorption amount of 53.3 ml/100 g.

Comparative Example 11

An all-solid-state lithium secondary battery was produced in the same manner as Example 1, except that the cathode active material layer was produced by using a solid electrolyte having an average particle diameter of 2.5 μm and a cathode active material having an oil absorption amount of 19.2 ml/100 g.

Comparative Example 12

An all-solid-state lithium secondary battery was produced in the same manner as Example 1, except that the cathode active material layer was produced by using a solid electrolyte having an average particle diameter of 2.5 μm and a cathode active material having an oil absorption amount of 53.3 ml/100 g.

Comparative Example 13

An all-solid-state lithium secondary battery was produced in the same manner as Example 1, except that the cathode active material layer was produced by using a solid electrolyte having an average particle diameter of 2 µm and a cathode active material having an oil absorption amount of 19.2 ml/100 g.

Comparative Example 14

An all-solid-state lithium secondary battery was produced in the same manner as Example 1, except that the cathode active material layer was produced by using a solid electrolyte having an average particle diameter of 2 µm and a cathode active material having an oil absorption amount of 53.3 ml/100 g.

[Charge-Discharge Test]

In an argon atmosphere desiccator (equipped with a temperature control) kept at 25° C., the batteries produced in Examples 1 to 7 and Comparative Examples 1 to 14 received 3 charge-discharge cycles, in each of which they were charged at a constant current (CC) of 0.3 mA to 4.2 V and then discharged at a CC of 0.3 mA to 2.5 V, in the state of being pressurized at a pressure of 1 ton/cm$^2$ ($\approx$98 MPa). The discharge capacity at the third cycle was measured and regarded as the initial capacity.

Thereafter, the batteries were charged at a CC of 0.3 mA to 3.6 V and then charged at a constant voltage (CV) of 3.6 V (not changed) to 0.003 mA. Then, the batteries were discharged for 10 seconds at ±0.1 mA, ±0.3 mA and ±1 mA, alternately. From the data thus obtained, I-V curves were created. Then, the initial resistances of the batteries were obtained from the slopes of the curves.

[Cycle Test]

After measuring the initial resistances, the batteries were discharged at a CC of 0.3 mA to 2.5 V. Then, the temperature of the atmosphere was increased to 60° C. After checking that the temperatures of the batteries were sufficiently increased, the batteries received 10 charge-discharge cycles, in each of which the batteries were charged at a CC of 0.3 mA to 4.2 V and then discharged at a CC of 0.3 mA to 2.5 V.

Then, the temperature of the atmosphere was decreased to 25° C. After checking that the temperatures of the batteries were sufficiently decreased, the discharge capacities of the batteries at the time when the batteries were charged at a CC of 0.3 mA to 4.2 V and then discharged at a CC of 0.3 mA to 2.5 V, were measured. For each battery, the capacity retention rate was calculated by dividing the discharge capacity by the initial capacity.

Then, the batteries were charged at a CC of 0.3 mA to 3.6 V and then charged at a CV of 3.6 V (not changed) to 0.003 mA. Then, the batteries were discharged for 10 seconds at ±0.1 mA, ±0.3 mA and ±1 mA, alternately. From the data thus obtained, I-V curves were created. Then, the resistances of the batteries after the cycle test were obtained from the slopes of the curves. For each battery, the resistance increase rate was calculated by dividing the resistance by the initial resistance.

Thereafter, the above cycle test was continuously repeated up to 100 cycles, thereby obtaining data on the capacity retention rates and the resistance increase rates.

[Cycle Test Results]

Table 1 shows the capacity retention rates and resistance increase rates of the batteries of Examples 1 to 7 and Comparative Examples 1 to 14 after the 100 cycles.

TABLE 1

| | Solid electrolyte | Cathode active material | After 100 cycles | |
|---|---|---|---|---|
| | Average particle diameter (µm) | Oil absorption amount (ml/100 g) | Capacity retention rate (%) | Resistance increase rate (%) |
| Example 1 | 1.5 | 35.7 | 78 | 128 |
| Example 2 | 1.5 | 40.2 | 79 | 126 |
| Example 3 | 1.5 | 45.5 | 77 | 127 |
| Example 4 | 2.5 | 35.7 | 76 | 127 |
| Example 5 | 2.5 | 40.2 | 79 | 127 |
| Example 6 | 2.5 | 45.5 | 77 | 127 |
| Example 7 | 2.0 | 35.7 | 79 | 126 |
| Comparative Example 1 | 1.5 | 19.2 | 50 | 180 |
| Comparative Example 2 | 1.5 | 24.6 | 60 | 155 |
| Comparative Example 3 | 1.5 | 31.2 | 65 | 145 |
| Comparative Example 4 | 1.5 | 53.3 | 70 | 135 |
| Comparative Example 5 | 0.8 | 35.7 | 72 | 130 |
| Comparative Example 6 | 5.0 | 35.7 | 64 | 142 |
| Comparative Example 7 | 0.8 | 19.2 | 48 | 158 |
| Comparative Example 8 | 5.0 | 19.2 | 38 | 200 |
| Comparative Example 9 | 0.8 | 53.3 | 65 | 138 |
| Comparative Example 10 | 5.0 | 53.3 | 50 | 160 |
| Comparative Example 11 | 2.5 | 19.2 | 42 | 190 |
| Comparative Example 12 | 2.5 | 53.3 | 70 | 145 |
| Comparative Example 13 | 2.0 | 19.2 | 45 | 185 |

TABLE 1-continued

| | Solid electrolyte | Cathode active material | After 100 cycles | |
|---|---|---|---|---|
| | Average particle diameter (μm) | Oil absorption amount (ml/100 g) | Capacity retention rate (%) | Resistance increase rate (%) |
| Comparative Example 14 | 2.0 | 53.3 | 68 | 142 |

Figure 3:
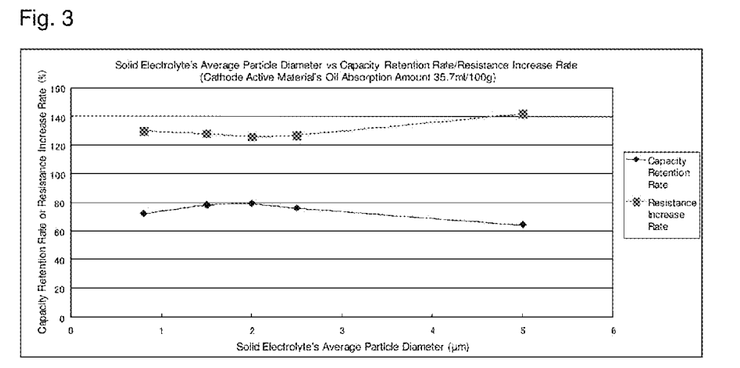
FIG. 3 is a view showing the relationship between the average particle diameters of solid electrolytes and the capacity retention rates of batteries and the relationship between the average particle diameters of solid electrolytes and the resistance increase rates of batteries.

For the batteries of Examples 1, 4 and 7 and Comparative Examples 5 and 6, the relationship between the average particle diameters of the solid electrolytes and the capacity retention rates after the 100 cycles and the relationship between the average particle diameters of the solid electrolytes and the resistance increase rates after the 100 cycles, are shown in FIG. 3.

Figure 4:
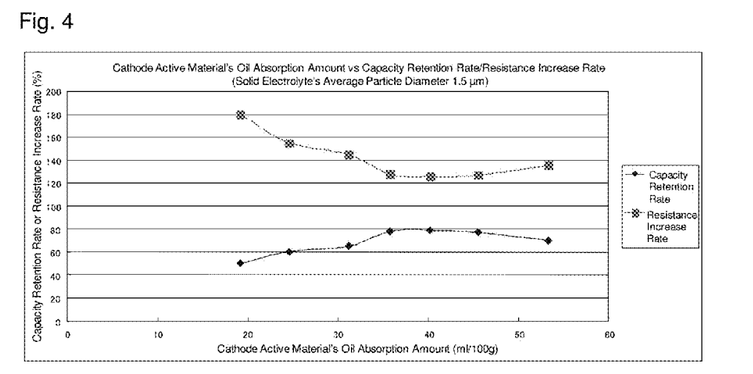
FIG. 4 is a view showing the relationship between the oil absorption amounts of cathode active materials and the capacity retention rates of all-solid-state secondary batteries and the relationship between the oil absorption amounts of cathode active materials and the resistance increase rates of all-solid-state secondary batteries, in the case of using a solid electrolyte having an average particle diameter of 1.5 μm.
Figure 5:
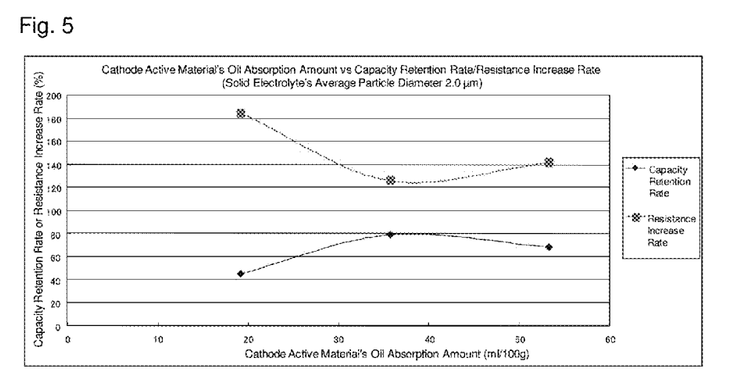
FIG. 5 is a view showing the relationship between the oil absorption amounts of cathode active materials and the capacity retention rates of all-solid-state secondary batteries and the relationship between the oil absorption amounts of cathode active materials and the resistance increase rates of all-solid-state secondary batteries, in the case of using a solid electrolyte having an average particle diameter of 2.0 μm.
Figure 6:
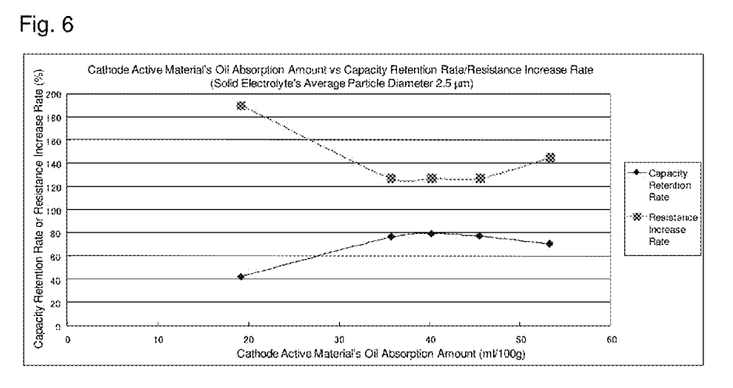
FIG. 6 is a view showing the relationship between the oil absorption amounts of cathode active materials and the capacity retention rates of all-solid-state secondary batteries and the relationship between the oil absorption amounts of cathode active materials and the resistance increase rates of all-solid-state secondary batteries, in the case of using a solid electrolyte having an average particle diameter of 2.5 μm.

Also, for the batteries of Examples 1 to 3 and Comparative Example 1 to 4, in each of which the solid electrolyte having an average particle diameter of 1.5 μm was used, the relationship between the oil absorption amounts of the cathode active materials and the capacity retention rates after the 100 cycles and the relationship between the oil absorption amounts of the cathode active materials and the resistance increase rates after the 100 cycles, are shown in FIG. 4. For the batteries of Example 7 and Comparative Examples 13 and 14, in each of which the solid electrolyte having an average particle diameter of 2.0 μm was used, the relationship between the oil absorption amounts of the cathode active materials and the capacity retention rates after the 100 cycles and the relationship between the oil absorption amounts of the cathode active materials and the resistance increase rates after the 100 cycles, are shown in FIG. 5. For the batteries of Examples 4 to 6 and Comparative Examples 11 and 12, in each of which the solid electrolyte having an average particle diameter of 2.5 μm was used, the relationship between the oil absorption amounts of the cathode active materials and the capacity retention rates after the 100 cycles and the relationship between the oil absorption amounts of the cathode active materials and the resistance increase rates after the 100 cycles, are shown in FIG. 6.

Figure 7:
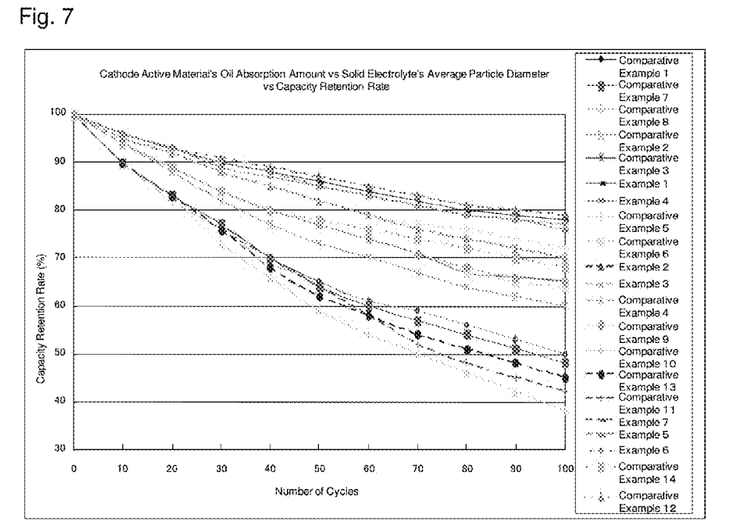
FIG. 7 is a view showing the relationship between the number of charge and discharge cycles of an all-solid-state secondary battery and the capacity retention rate of the same.
Figure 8:
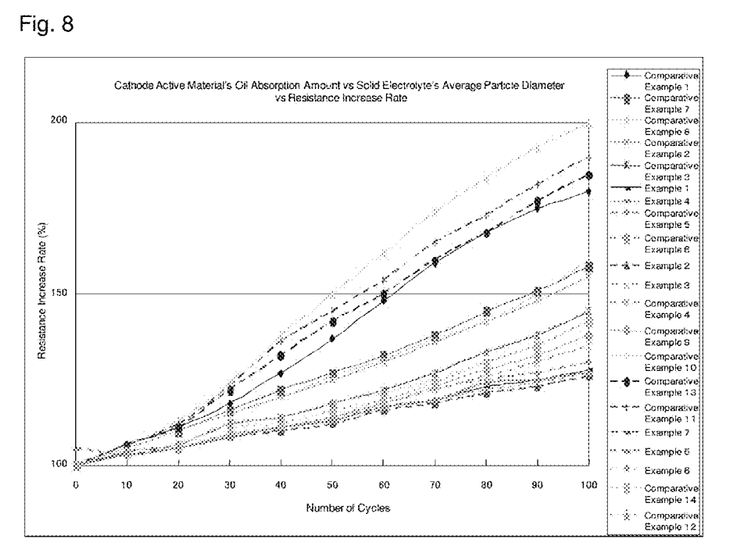
FIG. 8 is a view showing the relationship between the number of charge and discharge cycles of an all-solid-state secondary battery and the resistance increase rate of the same.

For the batteries of Examples 1 to 7 and Comparative Examples 1 to 14, the capacity retention rates per 10 cycles are shown in FIG. 7, and the resistance increase rates per 10 cycles are shown in FIG. 8.

As shown in Table 1, for the batteries of Examples 1 to 7 (in each of which the cathode active material layer was formed by combining the cathode active material having an oil absorption amount of 35 to 50 ml per 100 g with the solid electrolyte having an average particle diameter of 1.5 to 2.5 μm and then pressure-forming the resulting mixture in the absence of solvent), the capacity retention rates are high, and the resistance increase rates are low.

For the batteries of Comparative Examples 7 to 10 (in each of which the solid electrolyte having an average particle diameter outside the range of 1.5 to 2.5 μm and the cathode active material having an oil absorption amount outside the range of 35 to 50 ml per 100 g, were used), Comparative Examples 5 and 6 (in each of which the solid electrolyte having an average particle diameter outside the range of 1.5 to 2.5 μm and the cathode active material having an oil absorption amount of 35 to 50 ml per 100 g, were used) and Comparative Examples 1 to 4 and 11 to 14 (in each of which the cathode active material having an oil absorption amount outside the range of 35 to 50 ml per 100 g and the solid electrolyte having an average particle diameter of 1.5 to 2.5 μm, were used), the capacity retention rates are lower and the resistance increase rates are worse compared to the batteries of Example 1 to 7.

As shown in FIG. 3, it is clear that when the oil absorption amount of the cathode active material per 100 g is set in a range of 35 to 50 ml (35.7 ml) and the average particle diameter of the solid electrolyte is set to 1.5 to 2.5 μm, the capacity retention rate is increased and the resistance increase rate is decreased.

As shown in FIGS. 4 to 6, when the average particle diameter of the solid electrolyte is set to 1.5 μm, 2.0 μm and 2.5 μm, the capacity retention rate is increased and the resistance increase rate is decreased, in the case where the oil absorption amount of the cathode active material is 35 to 50 ml per 100 g.

As shown in FIG. 7, for the batteries of Examples 1 to 7, the capacity retention rates per 10 cycles are higher compared to the batteries of Comparative Examples 1 to 14.

As shown in FIG. 8, for the batteries of Examples 1 to 7, the resistance increase rates per 10 cycles are lower compared to the batteries of Comparative Examples 1 to 14.

CITATION LIST

1. Solid electrolyte layer
2. Cathode active material layer
3. Anode active material layer
4. Cathode current collector
5. Anode current collector
6. Cathode
7. Anode
100. All-solid-state secondary battery

The invention claimed is:

1. An all-solid-state secondary battery, comprising: a cathode, an anode, and a solid electrolyte layer disposed between the cathode and the anode,
   wherein the cathode comprises a cathode active material layer containing at least a cathode active material and a solid electrolyte;
   wherein the cathode active material comprises a lithium transition metal compound;
   wherein particles of the cathode active material have an oil absorption amount of 35 to 45.5 ml per 100 g, the oil absorption amount being defined by an amount of linseed oil absorbed inside and between primary particles of the particles of the cathode active material;
   wherein particles of the solid electrolyte have an average particle diameter of 1.5 to 2.5 μm; and
   wherein the cathode active material layer is formed by mixing the particles of the cathode active material and the particles of the solid electrolyte in the absence of solvent and pressure-forming the resulting mixture.

2. The all-solid-state secondary battery according to claim 1, wherein the particles of the cathode active material have a layered crystal structure each.

3. The all-solid-state secondary battery according to claim 1, wherein the particles of the solid electrolyte are particles of a sulfide-based solid electrolyte.

4. A method for producing an all-solid-state secondary battery, comprising the steps of:
    preparing a mixture by mixing at least particles of a cathode active material comprising a lithium transition metal compound and particles of a solid electrolyte in the absence of solvent, wherein the particles of the cathode active material have an oil absorption amount of 35 to 45.5 ml per 100 g, the oil absorption amount being defined by an amount of linseed oil absorbed inside and between primary particles of the particles of the cathode active material, and wherein the particles of the solid electrolyte have an average particle diameter of 1.5 to 2.5 μm, and
    pressure-forming the resulting mixture.

* * * * *